US010619591B2

(12) United States Patent
Graf et al.

(10) Patent No.: US 10,619,591 B2
(45) Date of Patent: Apr. 14, 2020

(54) METHOD FOR REGULATING A FUEL FEED PUMP

(71) Applicant: Continental Automotive GmbH, Hannover (DE)

(72) Inventors: Rolf Graf, Glashuetten (DE); Matthias Bludau, Stockstadt (DE)

(73) Assignee: Continental Automotive GmbH, Hannover (DE)

( * ) Notice: Subject to any disclaimer, the term of this patent is extended or adjusted under 35 U.S.C. 154(b) by 302 days.

(21) Appl. No.: 15/549,929

(22) PCT Filed: Feb. 11, 2016

(86) PCT No.: PCT/EP2016/052920
§ 371 (c)(1),
(2) Date: Aug. 9, 2017

(87) PCT Pub. No.: WO2016/131705
PCT Pub. Date: Aug. 25, 2016

(65) Prior Publication Data
US 2018/0030917 A1 Feb. 1, 2018

(30) Foreign Application Priority Data
Feb. 16, 2015 (DE) .................. 10 2015 202 777

(51) Int. Cl.
*F02D 41/30* (2006.01)
*H02P 6/15* (2016.01)
(Continued)

(52) U.S. Cl.
CPC ........... *F02D 41/3082* (2013.01); *F02D 1/08* (2013.01); *F02D 41/0097* (2013.01);
(Continued)

(58) Field of Classification Search
CPC ............ F02D 41/3082; F02D 41/0097; F02D 41/14098; F02M 51/04; H02P 6/06; H02P 6/15
See application file for complete search history.

(56) References Cited

U.S. PATENT DOCUMENTS

| 4,928,043 A | 5/1990 | Plunkett |
| 5,609,140 A | 3/1997 | Kramer et al. |

(Continued)

FOREIGN PATENT DOCUMENTS

| DE | 44 46 277 B4 | 6/1996 |
| DE | 197 42 993 C2 | 4/1999 |

(Continued)

*Primary Examiner* — Charles G Freay
(74) *Attorney, Agent, or Firm* — Cozen O'Connor

(57) ABSTRACT

A method for operating a fuel feed pump, the fuel feed pump having a pump system and an electrically commutated electric motor, the pump system being drivable by the electric motor, includes: detecting fluctuation in circular motion of the pump system over a rotational speed of the pump system to obtain a value of the fluctuation; standardizing the detected value of the fluctuation to obtain a standardized valise; and in a case in which a predefinable limit is exceeded by the standardized value, limiting a gradient of change in the rotational speed of the pump system.

10 Claims, 1 Drawing Sheet

(51) Int. Cl.
*F02D 1/08* (2006.01)
*H02P 6/06* (2006.01)
*F02D 41/00* (2006.01)
*F02D 41/14* (2006.01)
*F02M 51/04* (2006.01)

(52) U.S. Cl.
CPC ......... *F02D 41/1498* (2013.01); *F02M 51/04* (2013.01); *H02P 6/06* (2013.01); *H02P 6/15* (2016.02); *F02D 2001/082* (2013.01)

(56) References Cited

U.S. PATENT DOCUMENTS

| | | | |
|---|---|---|---|
| 5,923,134 | A | 7/1999 | Takekawa |
| 6,128,436 | A | 10/2000 | Bos et al. |
| 7,032,582 | B2 * | 4/2006 | Asano ................ F02D 41/0097 123/436 |
| 7,886,720 | B2 | 2/2011 | Graf |
| 2008/0252242 | A1 * | 10/2008 | Akama .................... H02P 6/06 318/400.14 |
| 2011/0120424 | A1 | 5/2011 | Fischer et al. |
| 2016/0123267 | A1 | 5/2016 | Kahlert |
| 2016/0265471 | A1 | 9/2016 | Graf et al. |

FOREIGN PATENT DOCUMENTS

| | | |
|---|---|---|
| DE | 199 33 331 A1 | 2/2000 |
| DE | 101 37 315 A1 | 2/2003 |
| DE | 10 2005 043 817 A1 | 3/2007 |
| DE | 10 2008 018 603 A1 | 10/2009 |
| DE | 10 2010 004 658 A1 | 5/2011 |
| DE | 10 2012 207744 A1 | 11/2013 |
| DE | 10 2014 222 162 B3 | 10/2015 |
| WO | WO 2015/055 666 A1 | 4/2015 |

\* cited by examiner

METHOD FOR REGULATING A FUEL FEED PUMP

CROSS-REFERENCE TO RELATED APPLICATIONS

This is a U.S. national stage of application No. PCT/EP2016/052920, filed on 11 Feb. 2016, which claims priority to the German Application No. 10 2015 202 777.5 filed 16 Feb. 2015, the content of both incorporated herein by reference.

BACKGROUND OF THE INVENTION

1. Field of the Invention

The invention relates to a method for operating a fuel feed pump assembly (hereinafter also referred to as a "fuel feed pump"), wherein the fuel feed pump has a pump (hereinafter also referred to as a "pump system" or "system") and an electrically commutated electric motor, wherein the pump system can be driven by the electric motor.

2. Related Art

Fuel feed pumps often operate according to the expeller principle. That is to say the fuel is expelled by the rotation of a mechanically rigid body within the fuel, and fuel is therefore fed in one direction. Changes in the medium to be fed act directly on the necessary torque for driving the pump system.

Modern fuel feed pumps are driven by electronically commutated electric motors which, owing to the design, have a fluctuation in the output torque over the rotational angle. In conjunction with the load fluctuations that typically occur in a fuel feed pump operating according to the expeller principle, problems may arise during the operation of the fuel feed pump. If the load fluctuations cause the instantaneously available output torque to be exceeded, a lose of synchronization between the rotor of the electric motor and the electrical field which drives the rotor may occur. This results in a severe drop in rotational speed and ultimately leads to a stationary state of the fuel feed pump.

Furthermore, in fuel feed pumps that operate according to the expeller principle, in particular the type of pumps referred to as g rotor pumps, additional influences also occur in the low rotational speed range, which also contribute to a fluctuation in the required torque over the revolutions of the pump system. In interaction with these fluctuations, which occur periodically with the rotational speed and the rotational angle-dependent fluctuations in the torque of the electric motor, fluctuations occur in the circular motion of the pump system of the fuel feed pump. These fluctuations have effects both due to parts of a revolution and also a plurality of revolutions. These fluctuations contribute to the predictions about the period length of the electrical commutation, which are required for demand-appropriate commutation, becoming less accurate. The occurrence of a fluctuation therefore adversely affects the accuracy of the following electrical commutations. This can lead to a loss of control of the electronics over the fuel feed pump, in particular at low rotational speeds and in certain pressure states at the pump system.

This lack of control is particularly disadvantageous since operation of the fuel feed pump in these critical rotational speed ranges cannot foe ensured in a stable fashion, and therefore the full technically possible operating spectrum of the fuel feed pumps cannot be utilized.

SUMMARY OF THE INVENTION

An object of the present invention is to provide a method that permits accurate monitoring of the fluctuations in the circular motion of the pump system and is further configured in such a way that counter measures can be taken against the problems of the prior art relating to the occurrence, or the amplification of, torque fluctuations.

An exemplary embodiment of the invention relates to a method for operating a fuel feed pump, wherein the fuel feed pump has a pump system and an electrically commutated electric motor, wherein the pump system can be driven by the electric motor, wherein the fluctuation in the circular motion of the pump system is detected over the rotational speed, the value of the fluctuation is standardized, and when a predefinable limit is exceeded by the standardized value the gradient of the change in the rotational speed of the pump system is limited.

Fuel feed pumps often operate according to the expeller principle or according to the flow principle. The method according to the invention can be applied to fuel feed pumps with both operational principles. In the text which follows, details are given essentially in relation to fuel feed pumps that operate according to the expeller principle. This does not explicitly rule out an application for fuel feed pumps that operate according to the flow principle.

Fuel feed pumps that operate according to the expeller principle include, in particular, what are referred to as g rotor pumps, screw pumps and rotary vane pumps. The latter are distinguished by a high level of hydraulic mechanical rigidity, which causes a change in the viscosity or in the pressure of the medium to be fed to have a direct effect on the torque required to drive the pump system. The occurrence of fluctuations in the circular motion is therefore promoted as a result of the design.

In conjunction with the fluctuating output torque of the electrically commutated electric motors that is a result of the design, a fluctuation can therefore occur in the circular motion of the pump system. The fluctuation corresponds in this case to the difference between the ideal circular motion of the pump system without fluctuation and the effective actual circular motion.

This fluctuation is particularly advantageously standardized in order to obtain a comparable variable which can be processed easily and can be used as a basis for corresponding counter-strategies.

The fuel feed pump generally has a controller that assumes the actuation of the fuel feed pump. This controller can be embodied as a dedicated pump controller or can be integrated into another controller of the motor vehicle. Networking of distributed individual components is also conceivable. The controller preferably also has a functionality for the detection of the fluctuation in the circular motion. The controller is also advantageously configured to store a multiplicity of detected values, to process them and to carry out a comparison between a plurality of values. It is also advantageous if the controller is configured designed to carry out a standardization of the detected fluctuation in the circular motion.

It is particularly advantageous if, in order to detect the fluctuation in the circular motion of the pump system, the period length of the electrical commutation of the electric motor is continuously detected, wherein the detected period lengths of the electrical commutation are compared with period lengths of preceding electrical commutations, wherein the difference forma the value for the fluctuation in the circular motion of the pump system.

The fluctuation in the circular motion of the pump system can be detected, for example, by continual monitoring of the position of the pump system or of the rotor of the electric motor. Other sensor systems that detect the movement of the rotor or of the pump system are also conceivable. However, since these sensor systems are complex and expensive it is particularly advantageous if the fluctuation is detected indirectly via an easily detectable measurement variable that is ideally detected in any case. It is therefore possible to determine and monitor the fluctuation accurately without additional costs for additional elements being entailed for this.

A particularly advantageous measure is what is referred to as the "jitter", which represents the difference between a period length, detected at a constant rotational speed, for electrical commutation of the electric motor with one or more preceding commutations detected at the same rotational speed. The jitter supplies a good measure of the currently occurring difference. The value for the jitter can advantageously also be standardized in order to ensure comparability. A standardized value is also easier to process. In particular, the response strategy to a standardized value can be defined more easily, since this value is independent of units.

It is also advantageous if a detected period length of the electrical commutation is compared with a mean value generated from a multiplicity of preceding period lengths of the electrical commutation, wherein the difference is detected.

As a result of the comparison of a currently detected period length with a value averaged over a plurality of periods a high level of reliability of the result against spontaneous and random errors can be achieved.

In one preferred exemplary embodiment the comparison of the detected period length of the electrical commutation with the period lengths of preceding electrical commutations takes place at a constant rotational speed.

Using period lengths at a constant rotational speeds ensures comparability of the values. As a result of changing the rotational speed, wherein the rotational speed means, in particular, the rotational speed of the pump system, the period length of the commutation is also automatically changed as a result of which comparability is no longer provided. The comparison can either take place in a continuously constant fashion or only when a rotational speed is present in a critical range. The critical ranges include, in particular, the relatively low rotational speed ranges. In the case of a critical constant rotational speed, the jitter rises as the pressure rises in the medium to be fed. Alternatively, in the case of a constant pressure and falling rotational speed the jitter rises in the range of critical rotational speeds.

Any fuel feed pump has a specific value for the jitter, which, when exceeded, an immediate stationary state of the pump system is to be expected owing to a lose of synchronization between the electrical field of the electric motor and the rotor. The difference between a critical range in which the jitter can assume such dimensions and a non-critical range is often very small so that very accurate monitoring of the jitter is particularly advantageous.

It is also to be preferred if the detection of the fluctuation in the circular motion and the standardization of the value take place on a constant and continuous basis. This is particularly advantageous in order to be able to react particularly quickly and have information about the occurrence and the intensity of fluctuations in the circular motion which is as close as possible to real time.

Furthermore, it is advantageous if the limitation of the gradient is variable, wherein the limiting value for the gradient is dependent on the magnitude of the detected and standardized value.

Variable limitation of the gradient of the change in the rotational speed is advantageous in order to perform suitable and demand-appropriate limitation as a function of the specific ambient conditions which have a strong influence on the behavior of the pump system and as a function of the respective load states. By limiting the gradient, in particular the speed with which the rotational speed of the pump system can be adapted is influenced. This reduces the possible dynamics of the system, for which reason this should take place only within defined limits. A high level of jitter corresponds to a relatively high fluctuation and therefore demands relatively strong delimitation in order to reliably prevent the occurrence of a stationary state of the fuel feed pump. In contrast, a relatively low standardized jitter value can be countered with low delimitation of the gradients without risking a stationary state of the fuel feed pump.

Furthermore, it is advantageous if the gradient of the change in rotational speed is limited as a function of the rotational speed of the pump system. This is advantageous since any rotational speed range has a different degree of inclination with respect to the occurrence of a jitter. Accordingly, the strength of the limitation of the gradient can vary over different rotational speed ranges.

It is also expedient if the standardized value of the fluctuation in the circular motion and/or the rotational speed of the pump system is passed onto an external entity. In particular, the external entity is formed by the engine controller. A suitable response to the occurrence of undesired fluctuations in the circular motion of the system pump can be output by the engine controller using the other status variables of the internal combustion engine. Damping of the system is achieved on the basis of the limitation of the gradient of the change in the rotational speed. The damping acts like a temporary increase in the inertia of the system or of the fuel feed pump, as a result of which the time that can pass until a suitable response arrives in reaction to the detected jitter at the electric motor can be lengthened. This is advantageous since as a result the vehicle communication, which to a certain extent provides only a slow data transmission rate, is also fast enough to transmit a suitable response to the electric motor of the fuel feed pump before a stationary state of the pump system occurs.

Furthermore, it is advantageous if the difference between the setpoint rotational speed predefined by the electrical commutation and the actual rotational speed of the pump system is detected, wherein when a predefinable limit is exceeded a message is issued to an external entity.

Owing to the fluctuations in the circular motion which, as already described, occur both as a result of the design and owing to external influences, the actually desired setpoint rotational speed that is predefined to the electric motor can differ from the actual rotational speed of the pump system. The difference can also be minimal here and generally comprises a value that is less than one revolution. A difference can lead to a negative influence of the system. Prompt counter measures can be triggered through prompt signaling of differences in the rotational speed.

Furthermore, it is expedient if an automatic system check is triggered at predefinable time intervals, wherein for this purpose the rotational speed of the pump system is varied to one or more levels that differ from the current actual state, wherein in each case the fluctuation in the circular motion of the pump system is detected, and the value of the fluctuation is standardized.

Such system checking is advantageous to detect the influences on the fuel feed system and as a result counter them through suitable regulating strategies. In this context, the mechanical state of the fuel feed pump, which is determined, for example, by the run-in state or the wear, is also relevant, like the factors resulting from the fuel such as, for example, the lubrication capability, the viscosity or the temperature. These factors are generally not easy to detect and, in particular, the interplay between the factors can lead to effects on the fuel feed system which adversely influence the operation.

As a result of the approach of a plurality of operating states, and the detection of the fluctuation in the circular motion of the pump system, it is possible to determine whether there is a change with respect to the occurring jitter compared to earlier times. These changes can be an indication of a change in the fuel feed system. By storage in a fault memory and comparison with predefinable characteristic values it is therefore possible to check the state of the fuel feed system at any time and therefore minimize risk of failure.

Furthermore, it is to be preferred if the load torque is detected over the rotation of the pump system, and the fluctuation in the output torque of the electric motor is detected, wherein fluctuation in the circular motion of the pump system is determined over the rotational speed from the superimposition of the fluctuations of the torques. This method is particularly advantageous for determining the fluctuation in the circular motion by purely measuring the torque fluctuations.

Furthermore, it is advantageous if when there is a change in the predefined value of the rotational speed of the pump system a limitation, dependent on the detected and standardized fluctuation in the circular motion, of the maximum permissible gradient of the change in the rotational speed is predefined. As soon as the actuation of the fuel feed pump is changed, because, for example, a new operating state is to be covered, an increase or generally a change in the jitter can occur. Therefore it is advantageous if, in the case of a change in the predefined rotational speed the gradient of the change in rotational speed is limited, to avoid the occurrence or the increasing of a jitter owing to excessive rapid changes in rotational speed.

BRIEF DESCRIPTION OF THE DRAWINGS

Further developments of the present invention are described in the dependent claims and in the following description of the figures.

In the text which follows, the invention will be explained in detail on the basis of exemplary embodiments and with reference to the drawings, in which.

DETAILED DESCRIPTION OF THE PRESENTLY PREFERRED EMBODIMENTS

Figure 1:
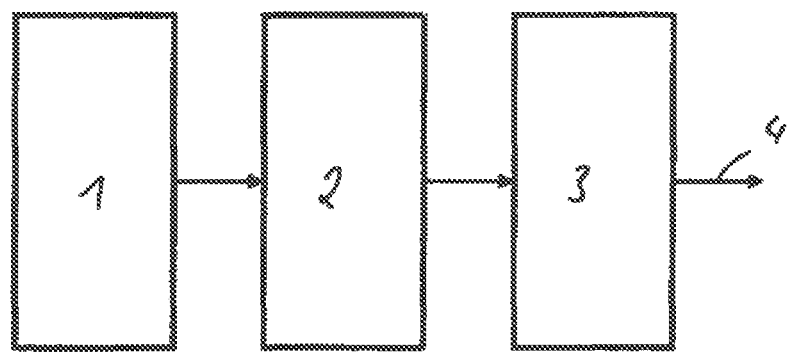
FIG. 1 shows a flow chart setting forth the method according to the invention.

FIG. 1 shows a flow chart setting forth the method according to the invention. In block 1, detection of the fluctuation in the circular motion of the pump system takes place. This can take place, for example, as a result of the use of position sensors. In block 2 the value detected in block 1 is standardized to obtain a uniform variable that permits definitive information to be obtained about the degree of the fluctuations. Finally, in block 3 it is checked whether the detected and standardized value is above a limiting value. If this is the case, a signal is output along the arrow 4, which signal gives rise to a limitation of the gradient of the change in the rotational speed of the pump system.

Figure 2:
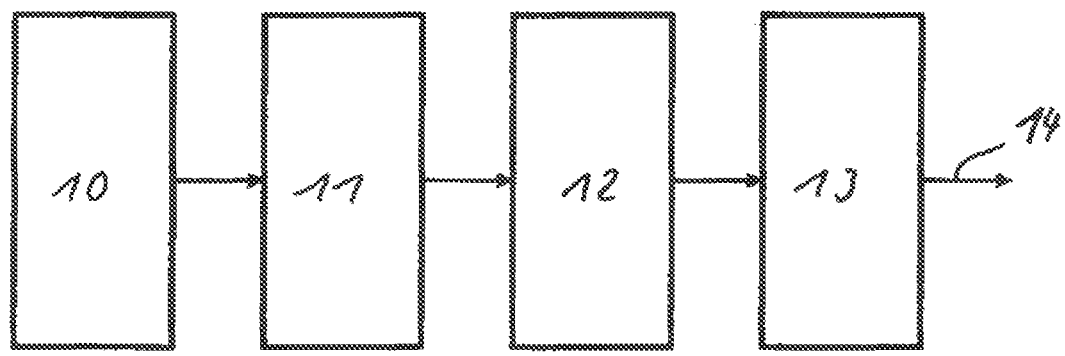
FIG. 2 shows a flow chart setting forth an alternative configuration of the method according to the invention.

FIG. 2 shows a flow chart of a method configured in an alternative way. Here, in block 10 the period length of an electrical commutation of the electric motor is detected. This commutation is directly dependent on the rotational speed.

In block 11 the detected period length is compared with a period length or with a multiplicity of period lengths of preceding electrical commutations. For this purpose, for example a mean value can also be formed from the preceding periods.

The comparison value is standardized in block 12. In block 13 the standardized value is compared with a predefinable limiting value and finally a signal for limiting the gradient of the change in the rotational speed is output along the arrow 14 if the limiting value has been exceeded.

The exemplary embodiments in FIGS. 1 and 2 do not, in particular, have a restrictive character and serve to illustrate the inventive step.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a fuel feed pump assembly, the fuel feed pump assembly having a rotary pump and an electrically commutated electric motor, the pump being drivable by the electric motor, the method comprising:
   detecting fluctuation in circular motion of the rotary pump over a rotational speed of the rotary pump to obtain a detected value of the fluctuation;
   standardizing the detected value of the fluctuation to obtain a standardized value; and
   taking countermeasures that limit a gradient of change in the rotational speed of the rotary pump, in a case in which a predefinable limit is exceeded by the standardized value.

2. The method as claimed in claim 1, wherein the detecting of the fluctuation in the circular motion of the rotary pump includes continuously detecting period lengths of the electrical commutation of the electric motor, wherein the detected period lengths of the electrical commutation are compared with period lengths of preceding electrical commutations, the difference between the compared period lengths being used to form the value for the fluctuation in the circular motion of the rotary pump.

3. The method as claimed in claim 2, wherein the difference is detected by comparing a detected period length of the electrical commutation with a mean value generated from a multiplicity of preceding period lengths of the electrical commutation.

4. The method as claimed in claim 2, wherein the comparison of the detected period length of the electrical commutation with the period lengths of preceding electrical commutations takes place at a constant rotational speed.

5. The method as claimed in claim 1, wherein the detecting of the fluctuation in the circular motion and the standardizing of the detected value of the fluctuation take place on a continuous basis.

6. The method as claimed in claim 1, wherein the gradient of the change in the rotational speed of the rotary pump is limited as a function of the rotational speed of the rotary pump.

7. The method as claimed in claim 1, further comprising passing on the standardized value of the fluctuation in the circular motion and/or the rotational speed of the rotary pump to an entity external to the rotary pump.

8. The method as claimed in claim 1, further comprising triggering an automatic system check at predefinable time intervals, the automatic system check comprising:
   varying the rotational speed of the rotary pump to one or more levels that differ from a current actual state,
   detecting the fluctuation in the circular motion of the rotary pump, and
   standardizing the value of the fluctuation.

9. The method as claimed in claim 1, further comprising detecting a load torque over the rotation of the rotary pump, detecting fluctuation in the output torque of the electric motor, and determining fluctuation in circular motion of the rotary pump over the rotational speed from a superimposition of fluctuations of the torques.

10. The method as claimed in claim 1, wherein in a case in which there is a change in a predefined value of the rotational speed of the rotary pump, a limitation, dependent on the standardized value of the fluctuation in the circular motion, of a maximum permissible gradient of the change in the rotational speed is predefined.

* * * * *